(12) United States Patent
Lymperopoulos et al.

(10) Patent No.: US 11,605,189 B2
(45) Date of Patent: *Mar. 14, 2023

(54) DYNAMIC VISUALIZATION AND DATA ANALYTICS BASED ON PARAMETER ACTIONS

(71) Applicant: Tableau Software, LLC, Seattle, WA (US)

(72) Inventors: Filippos Lymperopoulos, Seattle, WA (US); Bethany Meaghan Lyons, London (GB); Amy Nicole Forstrom, Seattle, WA (US); Allison Anne Whilden, Redmond, WA (US); John Paul Rudolph, Woodinville, WA (US); Benjamin Tonatiuh Medina-Orton, Seattle, WA (US); Dennis Nathan Bromley, Seattle, WA (US); Ruyi Shen, Seattle, WA (US); Amar Singh Lakhian, Seattle, WA (US); Andrew Alex Kim, Seattle, WA (US); Lisa Ann Bailey, Seattle, WA (US); Roxanne Roberta Agerone, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,251

(22) Filed: Jul. 26, 2021

(65) Prior Publication Data
US 2021/0358186 A1 Nov. 18, 2021

Related U.S. Application Data

(63) Continuation of application No. 16/812,170, filed on Mar. 6, 2020, now Pat. No. 11,074,731.
(Continued)

(51) Int. Cl.
G06T 11/20 (2006.01)
G06F 16/26 (2019.01)
(Continued)

(52) U.S. Cl.
CPC .......... *G06T 11/206* (2013.01); *G06F 3/0482* (2013.01); *G06F 16/26* (2019.01);
(Continued)

(58) Field of Classification Search
CPC ...... G06T 11/206; G06T 11/60; G06F 3/0482; G06F 16/26; G06F 16/289; G06F 16/9577; G06Q 10/067
See application file for complete search history.

(56) References Cited

U.S. PATENT DOCUMENTS 11,074,731 B2 * 7/2021 Lymperopoulos .... G06T 11/206
2004/0164983 A1    8/2004 Khozai
(Continued)

OTHER PUBLICATIONS

Office Communication for U.S. Appl. No. 16/658,573 dated Sep. 16, 2020, pp. 1-8.
(Continued)

*Primary Examiner* — Jeffery A Brier
(74) *Attorney, Agent, or Firm* — John W. Branch; Branch Partners PLLC

(57) ABSTRACT

Embodiments are directed to managing visualizations of data using a network computer. A modeling engine may provide a data model that includes a plurality of data objects and a display model that includes a plurality of display objects based on the plurality of data objects. Parameter action objects may be associated with display objects in the display model. In response to an activation of the parameter action objects, values associated with display objects may be assigned to the parameter associated with a parameter action
(Continued)

object and actions associated with the parameter may be executed to modify the display model.

20 Claims, 12 Drawing Sheets

Related U.S. Application Data

(60) Provisional application No. 62/815,881, filed on Mar. 8, 2019.

(51) Int. Cl.
  *G06F 3/0482*   (2013.01)
  *G06T 11/60*   (2006.01)
  *G06F 16/28*   (2019.01)
  *G06Q 10/06*   (2012.01)
  *G06Q 10/067*   (2023.01)

(52) U.S. Cl.
  CPC ............ *G06F 16/289* (2019.01); *G06T 11/60* (2013.01); *G06Q 10/067* (2013.01)

(56) References Cited

U.S. PATENT DOCUMENTS

| | | |
|---|---|---|
| 2008/0049030 A1 | 2/2008 | Keslin |
| 2008/0301540 A1 | 12/2008 | Sava et al. |
| 2013/0024453 A1 | 1/2013 | Duke |
| 2017/0076653 A1 | 3/2017 | Bell et al. |
| 2017/0132814 A1 | 5/2017 | Liu et al. |
| 2017/0154089 A1 | 6/2017 | Sherman |
| 2018/0336841 A1 | 11/2018 | Rathi et al. |

OTHER PUBLICATIONS

Office Communication for U.S. Appl. No. 16/658,573 dated Nov. 27, 2020, pp. 1-8.
Office Communication for U.S. Appl. No. 16/812,170 dated Dec. 21, 2020, pp. 1-7.
Office Communication for U.S. Appl. No. 16/812,170 dated Mar. 8, 2021, pp. 1-7.
Office Communication for U.S. Appl. No. 16/812,170 dated May 6, 20201, pp. 1-8.
Office Communication for U.S. Appl. No. 17/215,597 dated Dec. 14, 2021, pp. 1-18.
Office Communication for U.S. Appl. No. 17/215,597 dated Apr. 6, 2022, pp. 1-8.

* cited by examiner

DYNAMIC VISUALIZATION AND DATA ANALYTICS BASED ON PARAMETER ACTIONS

CROSS-REFERENCE TO RELATED APPLICATIONS

This Utility patent application is a Continuation of U.S. patent application Ser. No. 16/812,170 filed on Mar. 6, 2020, now U.S. Pat. No. 11,074,731 issued on Jul. 27, 2021, which is based on previously filed U.S. Provisional Patent Application No. 62/815,881 filed on Mar. 8, 2019, the benefit of the filing date of which are hereby claimed under 35 U.S.C. § 119(e) and § 120 and the contents of which are each further incorporated in entirety by reference.

TECHNICAL FIELD

The present invention relates generally to data visualization, and more particularly, but not exclusively, to managing the display of objects included in the data visualization.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data enables organizations to improve their understanding of critical business operations, analyze key performance indicators, or the like. In some the cases, the usefulness or utility of a visualization may be improved by enabling users to modify one or more features of the visualization so they may conduct their own analysis of the underlying data. However, enabling users to directly modify the one or more features may be disadvantageous because it may require users to have a more complete understanding of the underlying data and the visualization authoring tool than can be reasonable expected. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
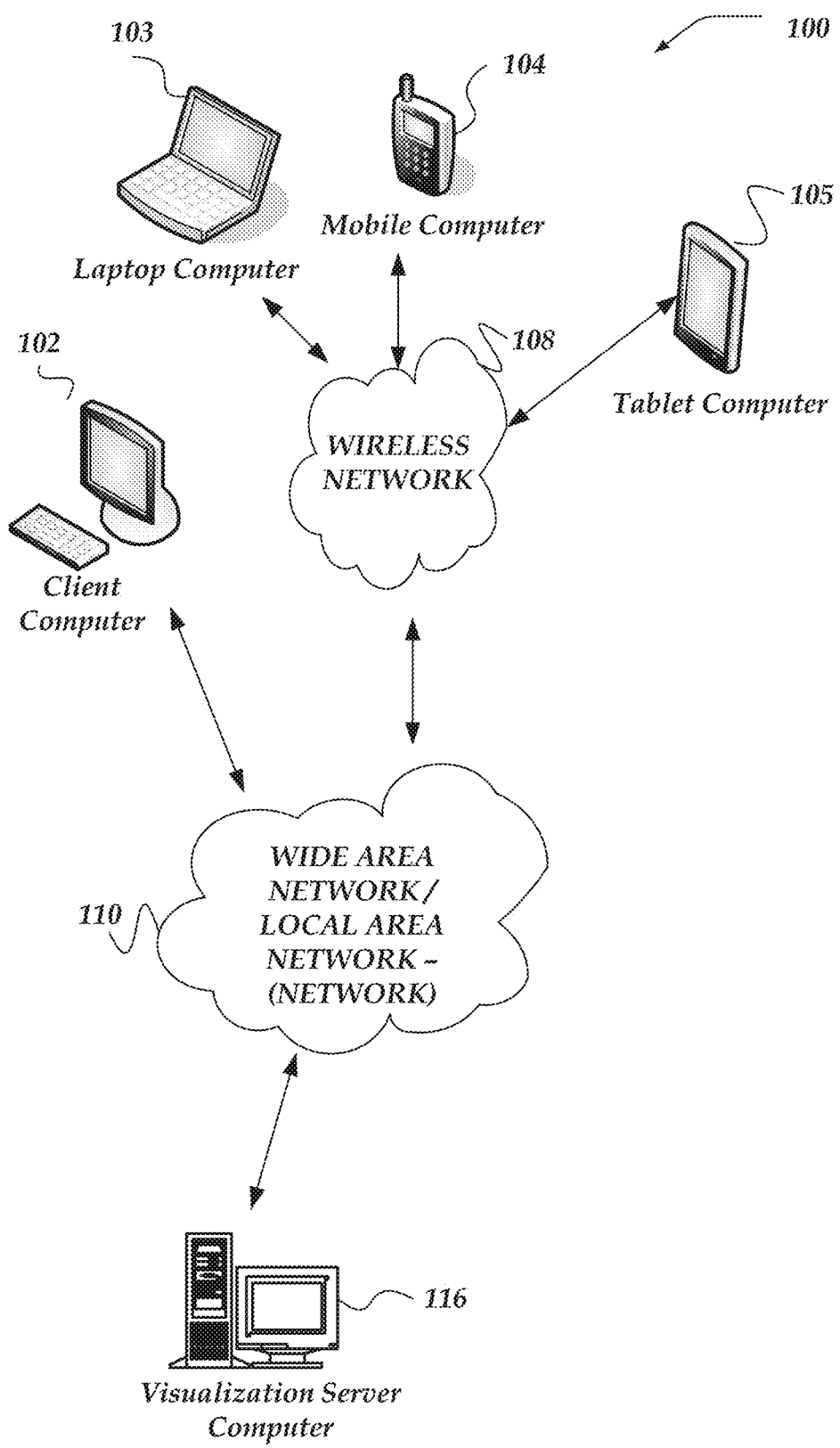
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein the term "data object" refers to one or more data structures that comprise data models. In some cases, data objects may be considered portions of the data model. Data objects may represent individual instances of items or entire classes or kinds of items.

As user herein the "display model" refers to one or more data structures that represent one or more representations of a data model that may be suitable for use in a visualization that is displayed on one or more hardware displays. Display models may define styling or user interface features that may be made available to non-authoring user.

As used herein the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model.

As used herein the term "parameter object" refers to one or more data structures that encapsulate a parameter for a visualization that an author of the visualization has exposed or otherwise made available to a user or viewer of the visualization. Parameter objects may be associated with fields, constants, expressions, or the like, of display objects or data objects. In some cases, parameter objects may be referred to as parameters because they enable users to provide input values that may modify a visualization.

As used herein the term "parameter action object," or "action object" refers to one or more data structures that encapsulate an association of one or more parameters objects and one or more actions, events, or behaviors with display objects in a display model. Parameter action objects may be associated one or more value fields in a display model. Also, parameter action objects may be defined or associated with configuration information that determines how to modify the display model based on changes made to parameter values. Parameter action objects may tie parameter objects, events, and actions to one or more display objects in the display model such that direct or indirect interaction with the tied display object automatically assigns values associated with one or more display objects or one or more data objects to the parameter object. Accordingly, the display model may be automatically modified based on actions defined by the parameter action object. For example, parameter action objects may be employed to define one or more parameter visualizations that display information associated with a selection of one or more display object in the main visualization.

As used herein, the term "configuration information" refers to information that may include rule based policies, pattern matching, scripts (e.g., computer readable instructions), plugins, extensions, or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to visualizing data using one or more processors that execute one or more instructions to perform as described herein. In one or more of the various embodiments, one or more parameter objects that may be associated with one or more display objects of a display model may be provided such that the display model may be based on a data model. In some embodiments, providing one or more parameter objects may include associating one or more display object fields with the one or more parameter objects such that the one or more display object fields are associated with the one or more display objects. Also, in some embodiments, providing one or more parameter objects may include associating one or more data object fields with the one or more parameter objects such that the one or more data object fields may be associated with one or more data objects that may be associated with the one or more display objects.

In one or more of the various embodiments, one or more action objects that may be associated with the one or more parameter objects may be provided such that the one or more action objects may be associated with one or more events.

In one or more of the various embodiments, a visualization based on the one or more display objects may be displayed.

In one or more of the various embodiments, an event may be triggered based on one or more user interactions associated with a display object associated with a parameter object such that the one or more user actions include one or more of selecting the display object, hovering over the display object, selecting one or more other associated display objects, or the like.

Also, in one or more of the various embodiments, an event may be triggered based on one or more changes to one or more values associated with one or more data objects such that the one or more data objects are associated with the portion of the parameter objects.

In one or more of the various embodiments, in response to occurrence of an event, further actions may be performed as described below.

In one or more of the various embodiments, a portion of the one or more action objects associated with the event may be determined based on the event.

In one or more of the various embodiments, a portion of the one or more parameter objects may be determined based on the portion of the action objects.

In one or more of the various embodiments, one or more parameter display objects may be generated based on the portion of action objects and the portion of the parameter objects. In one or more of the various embodiments, generating the one or more parameter display objects may include: determining one or more data objects that may be associated with the portion of the parameter objects based on the display model and the data model; determining one or more partial values based on the one or more data objects; employing the one or more partial values to generate the one or more parameter display objects; or the like.

In one or more of the various embodiments, one or more parameter visualizations may be generated based on the one or more parameter display objects such that the visualization may be modified to include the one or more parameter visualizations.

In one or more of the various embodiments, the modified visualization may be displayed.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
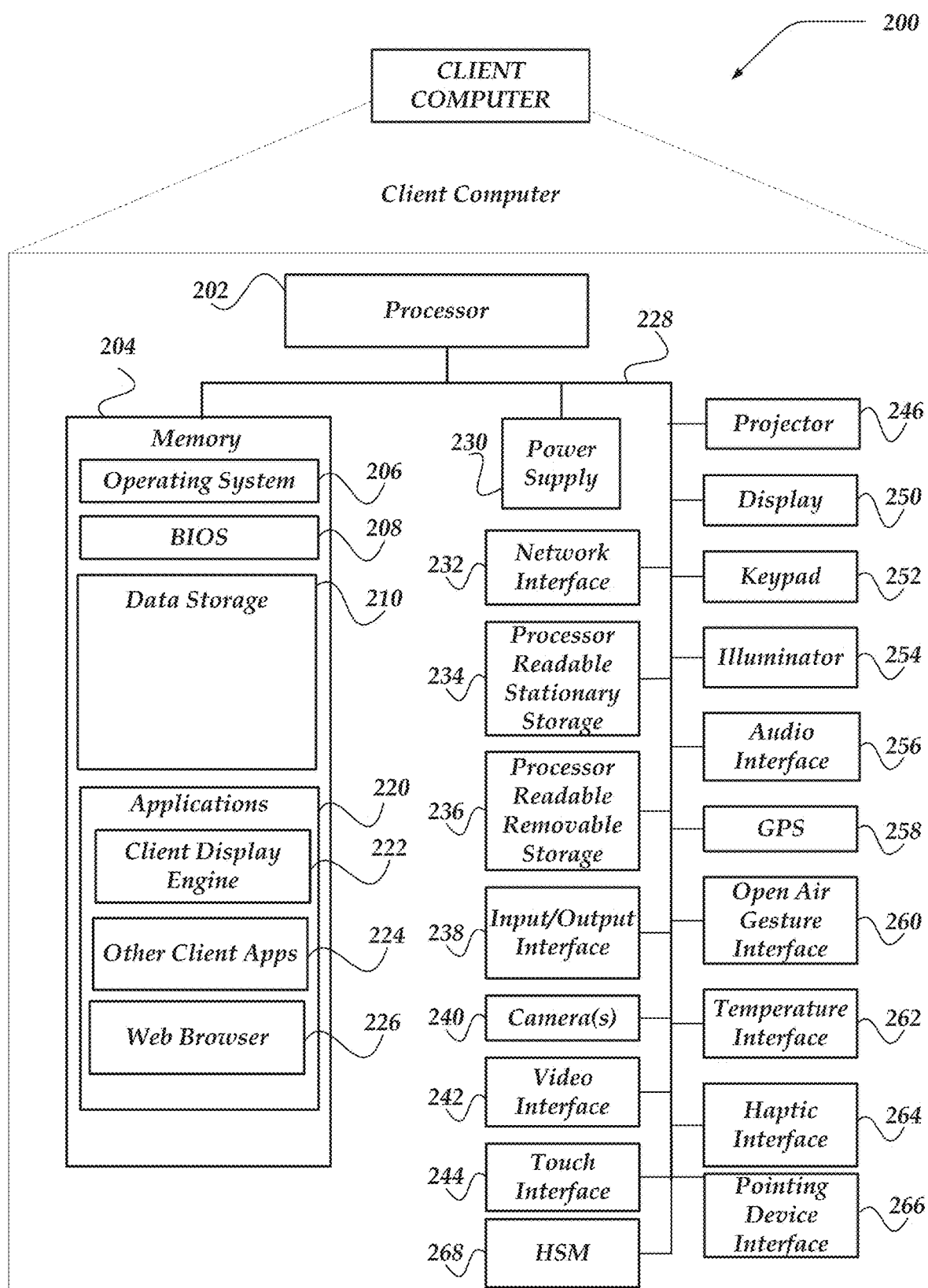
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
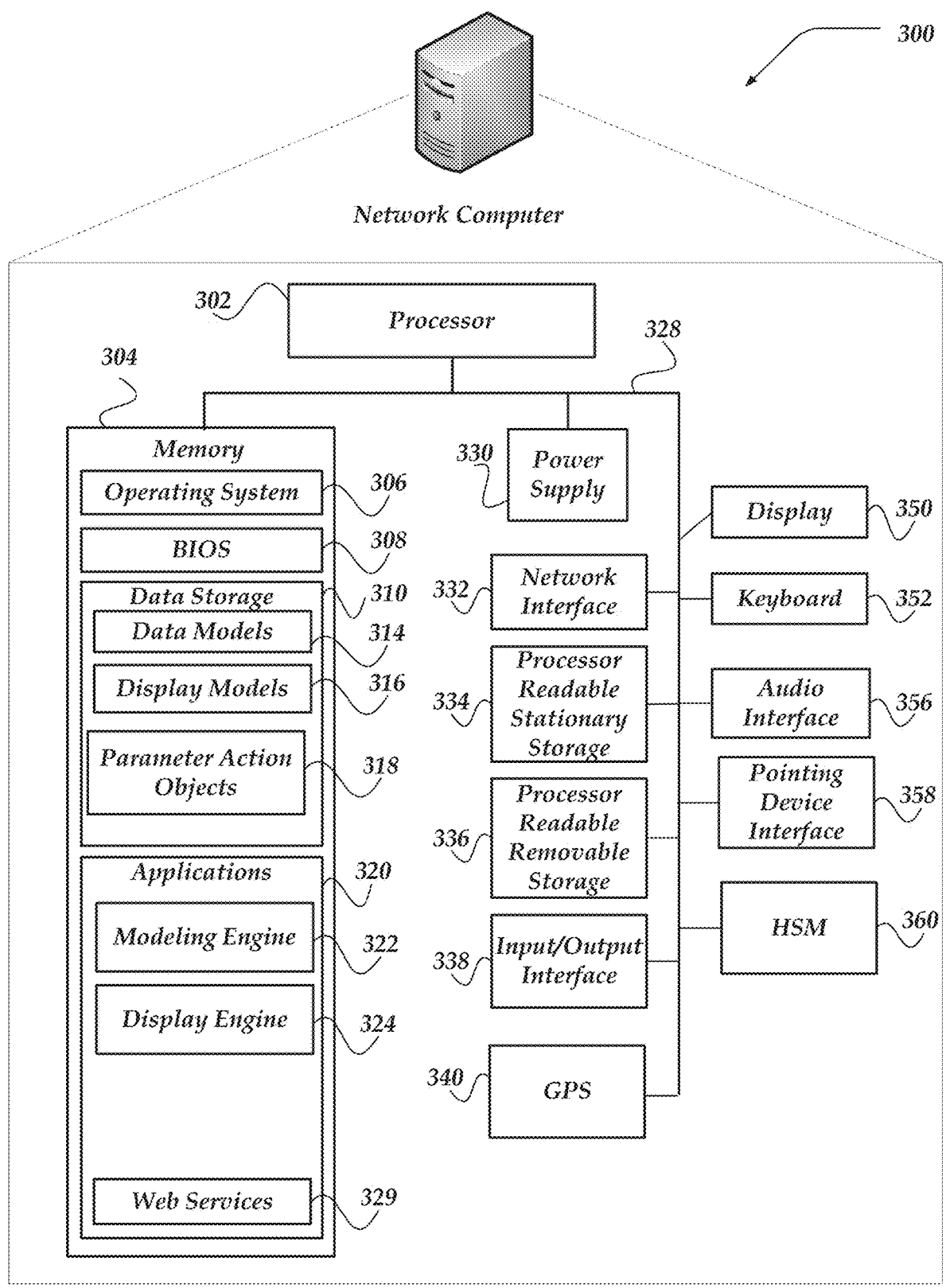
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, display engine 324, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, parameter action objects 318, or the like. Data models 314 may store files, documents, versions, properties, meta-data, data structures, or the like, that represent one or more portions of one or more data models. Display models 316 may store display models. Parameter action objects 318 may store one or more parameter action objects for one or more display models.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, display engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, display engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, display engine 324, web services 329, or the like, may be provisioned and de-commissioned automatically.

Also, in one or more of the various embodiments, modeling engine 322, display engine 324, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
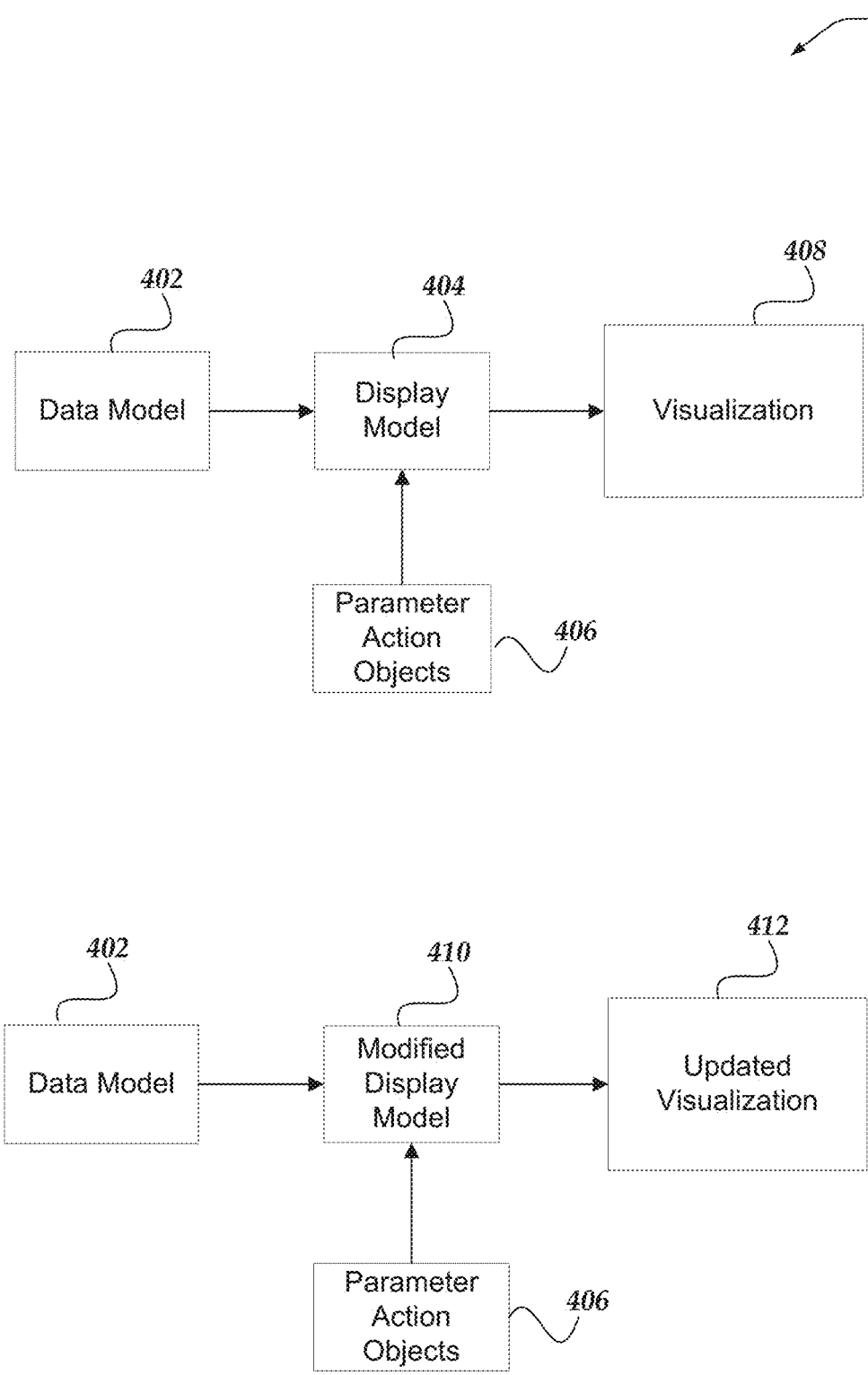
FIG. 4 illustrates a logical architecture of a system for dynamic visualization and data analytics based on parameter actions in accordance with one or more of the various embodiments.

FIG. 4 illustrates a logical architecture of system 400 for dynamic visualization and data analytics based on parameter actions in accordance with one or more of the various embodiments. In one or more of the various embodiments, system 400 may include: one or more data models, such as, data model 402, which may be comprised of several data objects; one or more display models, such as, display model 404; one or more visualizations, such as, visualization 408. In one or more of the various embodiments, one or more users may be authorized to generate display models, such as, display model 404 based on data models, such as, data model 402. Generally, the users that are enabled to generate display models may be considered authors of the display model (e.g., authoring users).

In one or more of the various embodiments, other non-authoring users may be enabled to view one or more visualizations, such as, visualization 408, that are generated from a display model for display on a hardware display (not shown).

In one or more of the various embodiments, an authoring user may be enabled to configure or provide one or more parameter action objects, such as, parameter action objects 406 that may be associated with one or more display objects that comprise a display model, such as, display model 404. As described below, each parameter action object may be associated with one or more display objects.

In one or more of the various embodiments, display models provided by an author for generating visualization 480 may include one or more parameters that may be associated with one or more values in a display model that are used to generate visualizations. For example, domain values used rendering a plot lines may be values in a display model that may be associated with one or more parameters.

In some embodiments, an authoring user may define one or more parameters or parameter values that may be associated with one or more fields or values of one or more display objects in a display model. In some embodiments, system 400 may include a modeling engine (not shown here) that enables an author to interactively select or define one or more parameters and associated the one or more parameters with one or more action to generate one or more parameter action objects.

In one or more of the various embodiments, display models may be comprised of one or more display objects. In some embodiments, display objects may represent a visualization or a partial visualization of the data associated with one or more data objects in a data model. The particular visualization expressed by a display object may be selected based the composition (e.g., data type, field values, properties, number of items, semantic meaning, or the like) of a given data object. In some embodiments, a data object may be associated with more than one display object, each representing a different visualization of the given data object or different portion of the visualization. Accordingly, display objects may be arranged to represent different common, uncommon, or custom, visualization elements, such as, line plots, surface plots, bar charts, pie charts, tables, text fields, text areas, points, labels, background areas, or the like, that may be included in visualizations to provide analytics that may improve a user's understanding of the underlying data. In some embodiments, visualizations may be directed to different audiences, such as, customers, stakeholders, internal teams, business intelligence teams, or the like. Accordingly, in some embodiments, more than one display model may be generated or associated with the same data model.

In one or more of the various embodiments, data models may include complex data representations that require data analysis or schema analysis to understand. Further, in some embodiments, the raw data or values comprising data objects that make up a data model may include restricted or sensitive information. Accordingly, in some embodiments, authors of display models may be required to have extensive or detailed knowledge of the data models. Likewise, in some embodiments, if the data is restricted or sensitive, authors may require additional vetting, screening, privileges, or monitoring to help ensure the data they are accessing is protected.

Accordingly, in some embodiments, an author may provide display models based on complex or sensitive data for use by other users (e.g., non-authoring users). These display models may be fixed such that they offer pre-defined or limited views or interaction options for a non-authoring user. Thus, in some embodiments, an authoring user may have to predict or anticipate the needs of the user when designing a display model from a data model. In some embodiments, for many well-known reasons it may be difficult to hit the mark. Thus, in some cases, authors may include too much or too little information or interactivity in the display models.

In one or more of the various embodiments, a modeling engine may be arranged to enable one or more parameter action objects, such as, parameter action objects 406 to be associated with one or more display objects in a display model. In one or more of the various embodiments, parameter action objects may be associated with one or more parameters, one or more display object fields, one or more data objects, one or more data object fields, one or more actions, one or more trigger events, one or more signals, one or more constraints, or the like.

In one or more of the various embodiments, interactions performed by a user, such as, clicking on portions of display objects, hovering a user-interface pointer over a display object, or the like, may trigger the activation of a parameter action object. Also, in some embodiments, trigger events may be associated with values or value changes associated with one or more parameters, one or more display object fields, one or more data objects, one or more data object fields, or the like. Accordingly, in some embodiments, one or more trigger events may be associated one or more threshold values, ranges, value patterns, or the like, directed to values of fields or objects that may be separate from the one or more fields associated with a parameter action object. For example, in some embodiments, parameter action object A may be based a field in data object A while its trigger event may be associated with another field in data object B.

In one or more of the various embodiments, authoring users may associate one or more parameter action objects with one or more display objects. In some embodiments, user interactions with display objects that are associated with parameter action objects may enable one or more data values to be selected from the display model and assigned to a parameter for use by actions that may provide additional analytic capability to a display model.

In one or more of the various embodiments, if a non-authoring user triggers or activates a parameter action object, the display engine may be arranged assign one or more display object field values to the parameter that may be associated with the parameter action object. Then the actions associated with the parameter may be executed by the display engine to dynamically modify the display model based on the parameter value.

For example, system 400 may include one or more parameter action objects, such as, parameter action objects 406, that are associated with one or more display objects in display model 404. Accordingly, in one or more of the various embodiments, if one or more the display objects are interacted with by a non-authoring user, a display engine may be arranged to modify the display model based on the value or values assigned to the parameter by executing one or more actions that may be associated with the parameter.

In this example, for some embodiments, modified display model 410 represents a display model that is generated based on the interactions with one or more display objects that may be associated with one or more parameter action objects. Accordingly, in some embodiments, updated visualization 412 may be displayed on a hardware display based on modified display model 410.

Figure 5:
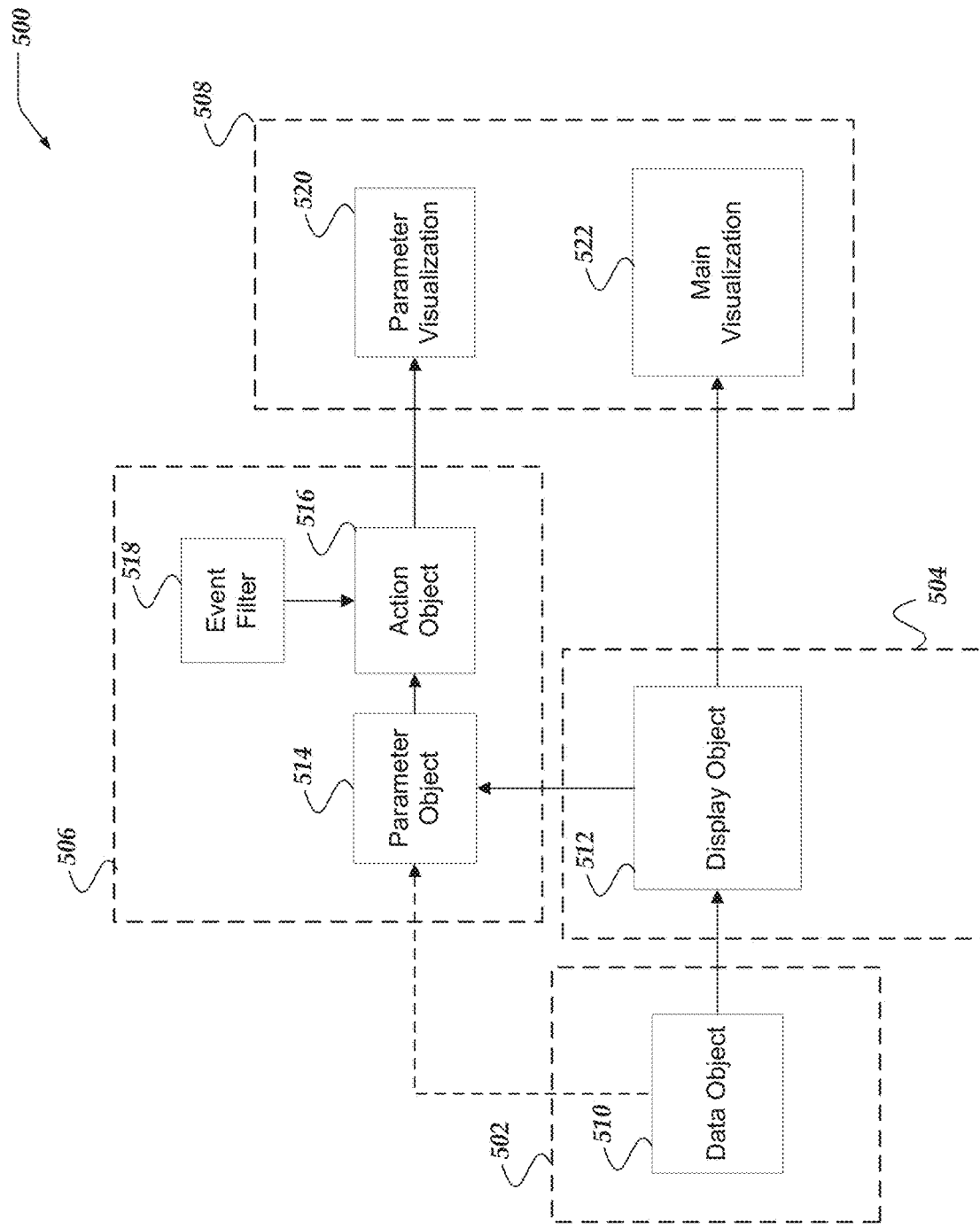
FIG. 5 illustrates a logical architecture of a system for dynamic visualization and data analytics based on parameter actions in accordance with one or more of the various embodiments.

FIG. 5 illustrates a logical architecture of system 500 for dynamic visualization and data analytics based on parameter actions in accordance with one or more of the various embodiments. Similar to system 400 described above, in one or more of the various embodiments, system 500 may be arranged to include data model 502, display model 504, parameter action object 506, visualization 508, or the like. In some embodiments, data models, such as, data model 502 may be associated with one or more data objects, such as, data object 510. In some embodiments, display models, such as, display model 504 may include one or more display objects, such as, display object 512. In some embodiments, parameter action objects, such as, parameter action object 506 may be arranged to include parameter object 514, action object 516, event filter 518, or the like. In some embodiments, visualizations, such as, visualization 508 may be comprised of one or more visualizations, such as, main visualization 522, parameter visualization 520, or the like.

In one or more of the various embodiments, data objects may represent various entities in a data model. In some embodiments, data objects, such as, data object 510 may correspond to one or more data tables, documents (e.g., spreadsheets, CSV files, XML, files, or the like), various data views, or the like. In some embodiments, visualization authors may be enabled to define data objects based on various data sources, such as, databases, tables, documents, or the like. In some embodiments, a data object may be defined to include more or fewer data fields that may be provided by the originating data source. In some embodiments, one or more may be derived or computed from one or more data sources or data source fields. For example, in some embodiments, if the data source includes a product table, the data object may be defined to omit one or more fields from the product table. Likewise, for example, the data object may include one or more fields from other tables, or fields that may be derived or computed from values in the data source.

In one or more of the various embodiments, one or more display object may be defined to represent visual or graphical representations of the information represented by data objects. In some embodiments, display objects may represent one or more of lines, graph, chart, chart segments, lists, marks, legends, or the like, the may be rendered by a display engine into visualizations. For example, in some embodiments, a pie chart visualization may be based on several display objects representing different parts of the visualization, such as, pie segments, labels, legend, summary information, or the like. Thus, for example, in some embodiments, a larger display object, such as, a pie chart object may be comprised of smaller display objects, such as, segment objects. Likewise, for example, if a display object representing a line graph may be comprised of multiple other display objects representing different parts of the line graph, such as, domain axis, range axis, marks or points, the line itself, other markers or emphasis indicators, or the like. Accordingly, in this example, display object 512 represents a display object that may be based on information (data) provided by data object 510.

In one or more of the various embodiments, a display engine, such as, display engine 324 may be arranged to render display objects (from a display model) into an actual visualization that may be displayed on a hardware display, printed, or the like. In some embodiments, visualizations may be defined based on the display model. In some embodiments, display models may include one or more display object that enable user interaction or user input. For example, in some embodiments, one or more display objects comprising a visualization may enable users to click on parts of the visualization to select parts of the visualization (e.g., particular display objects). In some embodiments, the display engine may enable events associated with user input/interactions. Further, in some embodiments, display engines may be arranged to generate one or more events based on or in response to data changes. In some embodiments, such events may include information about the display object that is associated with an event, the type of event, or the like.

In one or more of the various embodiments, parameter action objects, such as, parameter action object 506, may be arranged to include a parameter object, such as, parameter object 514 may be defined to be associated with a display object, such as, display object 512. Accordingly, in some embodiments, parameter objects may obtain values from the associated display objects. In some embodiments, parameter objects may be configured to receive values associated with a portion of a display object. For example, in some embodiments, display objects may be arranged to include more than one display field representing different values. Thus, for example, a parameter object may be arranged to receive data from a particular set of display fields. For example, in some embodiments, a display object representing a bar chart may be arranged such that each category value in the chart may be a display field rather than a separate display object. In some embodiments, visualization authors may be guided by design considerations in selecting of defining display objects, including selection of display fields. Also, in some embodiments, modeling engines or display engines may be arranged to employ rules, templates, or the like, provided via configuration information to determine the arrangement or selection of the display objects to account for local circumstances or local requirements.

In one or more of the various embodiments, action objects, such as, action object 516 may be associated with parameter objects, such as, parameter object 514. In one or more of the various embodiments, action objects may be arranged to define one or more actions that may be associated with a parameter object. In some embodiments, actions defined by the action object may include responding to events that may be selected or determined based on an event filter, such as, event filter 518.

In one or more of the various embodiments, action objects may be arranged to encapsulate the data structures, data, instructions, rules, conditions, or the like, that be employ to perform actions based on the current value of a parameter object. For example, in some embodiments, action object 516 may be arranged to generate or modify one or more display objects based a current value of a parameter object. In some embodiments, these display objects may be added to the display model for rendering into a visualization, such as, visualization 508. Also, in some embodiments, action objects may be configured to execute various data shaping or data manipulation processes on the value of a parameter object. In some embodiments, action objects may be arranged to generate display objects based on the parameter object.

In some embodiments, these display objects may be employed to generate a parameter visualization, such as, parameter visualization 520, or the like. In some embodiments, parameter visualizations may provide a visualization based on the parameter object. In some embodiments, parameter visualizations may be displayed along with a main visualization, such as, main visualization 522. Accordingly, in some embodiments, main visualization 522 may be considered to display information associated with the overall subject being explored or being illuminated. In contrast, in some embodiments, parameter visualizations may be considered to display information associated with one or more selected parameter objects. In some embodiments, the parameter visualization may be visually distinct or distinguished from the main visualization. In other cases, for some embodiments, parameter visualizations may be arranged to appear integral to the main visualization.

For example, in some embodiments, a parameter visualization may be arranged to show a graph or chart separate from the main visualization to highlight or emphasize one or more characteristics or properties of a selected parameter object. Thus, in such cases, the parameter visualization may be arranged to appear separate from the main visualization.

In contrast, for example, in some embodiments, a parameter action object may be arranged to highlight or emphasize a portion of a main visualization such that the parameter visualization may appear to be integral to the main visualization rather than appearing to be separate.

In one or more of the various embodiments, event filters, such as, event filter 508 may be arranged to identify the type of events that may activate an action object. For example, in some embodiments, events may include different types of user inputs, such as, selecting/clicking, hovering, or the like. Also, in some embodiments, events may be tied to activity or conditions associated with display object field values or data object field values, such as, values exceed threshold values, values matching patterns, values being within a defined range, or the like. In one or more of the various embodiments, visualization authors may be enabled to select and configure one or more events that may trigger actions.

Figure 6:
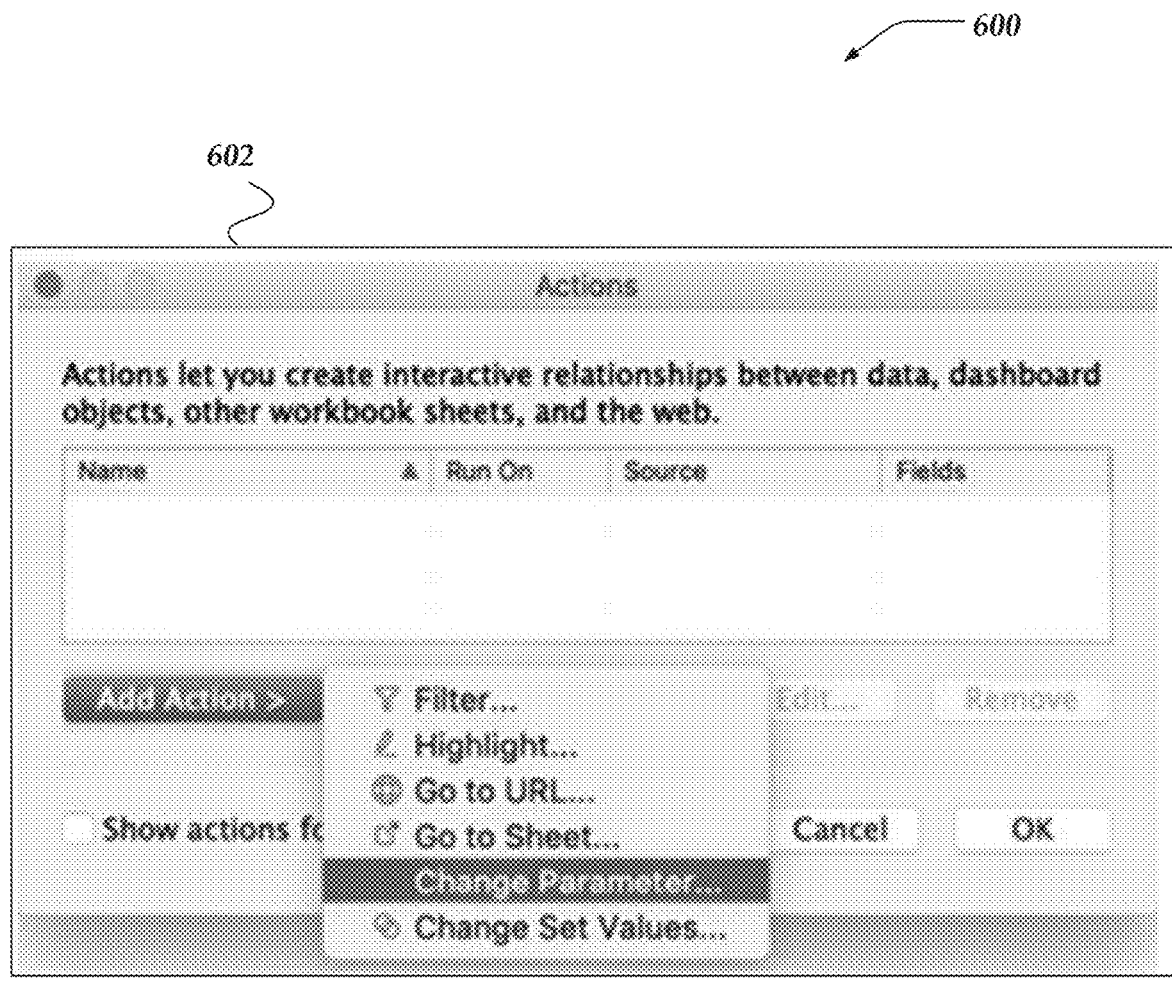
FIG. 6 illustrates a portion of a user interface for associating parameters in a display model with one or more actions in accordance with one or more of the various embodiments.

FIG. 6 illustrates a portion of user interface 600 for associating parameters in a display model with one or more actions in accordance with one or more of the various embodiments. In some embodiments, a display engine may generate one or more user interfaces that enable visualization authors to associate various parameters with actions. In this example, dialog box 602 may be provided by a display engine to enable a visualization author to create parameters, associate actions with parameters, or the like.

Figure 7:
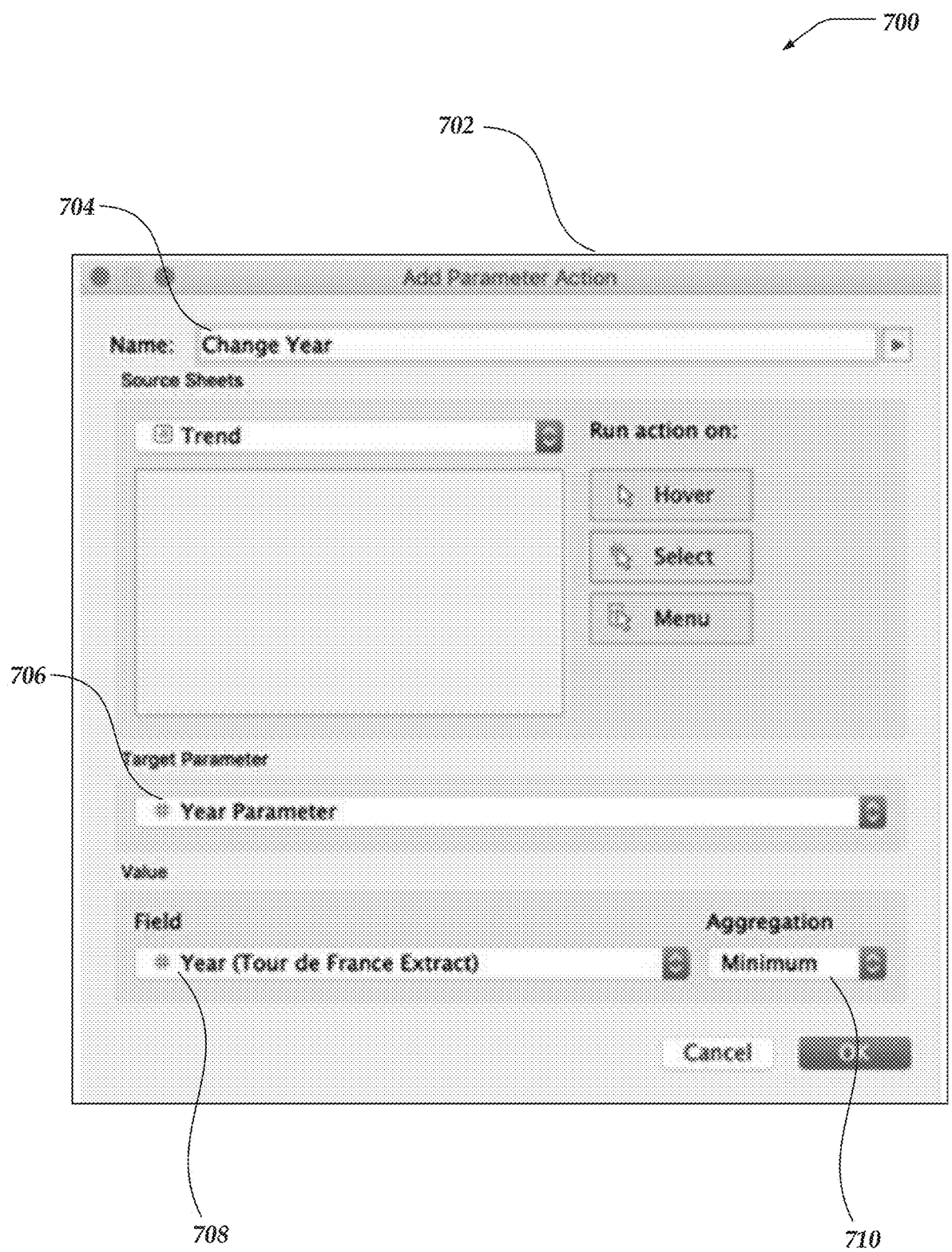
FIG. 7 illustrates a portion of a user interface for generating one or more parameter action objects in accordance with one or more of the various embodiments.

FIG. 7 illustrates a portion of user interface 700 for generating one or more parameter action objects in accordance with one or more of the various embodiments. In this example, dialog box 702 may be provided by a display engine to enable visualization authors to define or create one or more parameter action objects. Accordingly, in this example, text control 704 may be employed to define a user friendly/readable label for the parameter action object. Also, in this example, list control 706 may be employed for selecting a parameter in the display model for associating with a value based on a field in the display model. And, in this example, list control 708 may enable a visualization author to select one or more display object fields in the display model that may be designated to provide values for the parameter selected in list control 706. In some embodiments, the fields available for selection in list control 708 may correspond to display objects or portions of display objects that correspond to a value based on the data that is used for the visualization. For example, in some embodiments, if the visualization is a x-y plot, one or the fields may correspond to the domain (x axis values) of the plot.

Also, in some embodiments, list control 710 may contain one or more functions, such as, such as, average, mean, minimum, maximum, or the like, that may be applied to the field selected in list control 708. In some embodiments, if a function, is selected, it may be applied to values corresponding to the field selected in list control 708 before assigning values to the parameter that was selected in list control 706.

Figure 8:
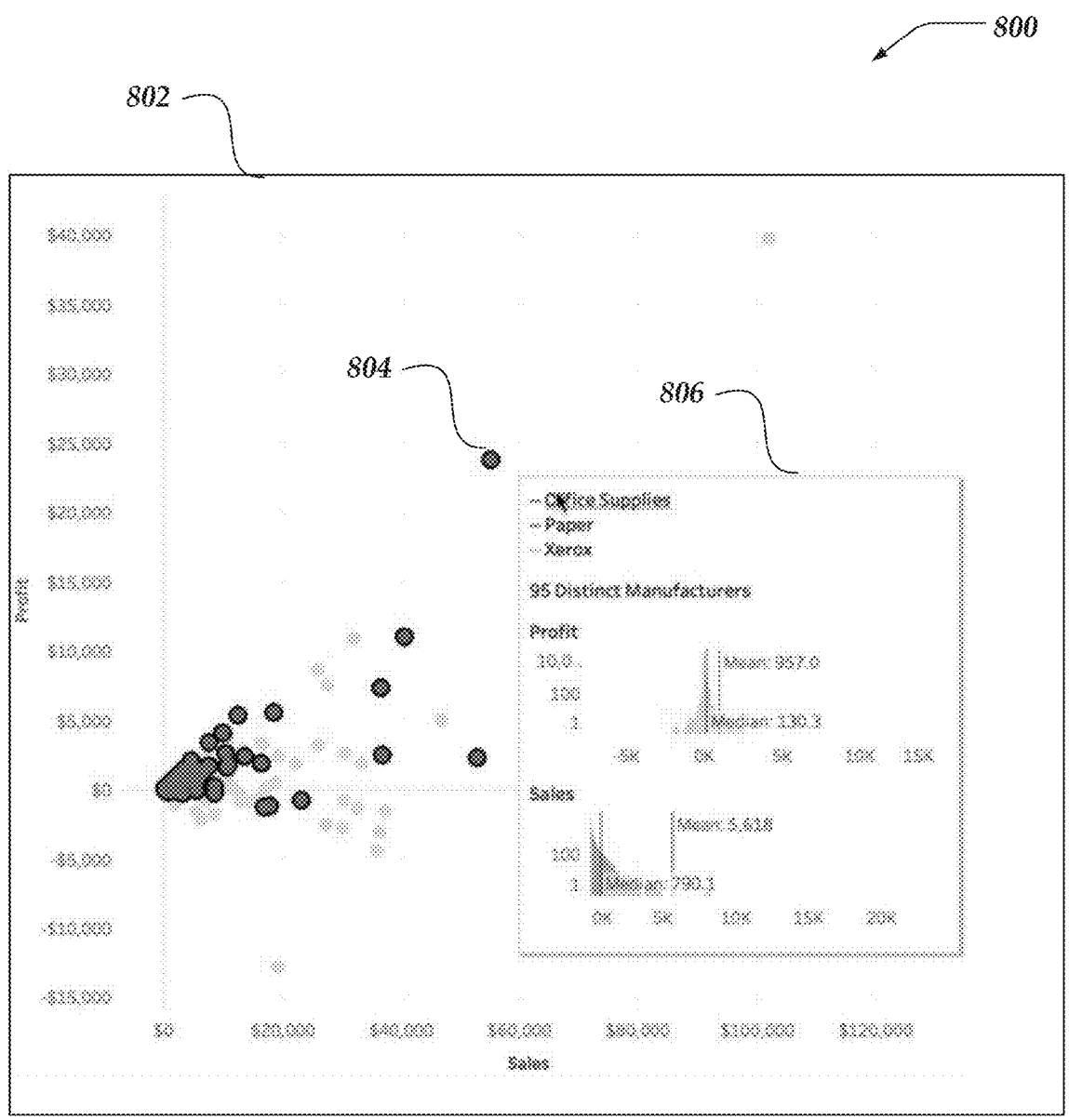
FIG. 8 illustrates a portion of a user interface for dynamic visualization and data analytics based on parameter actions in accordance with one or more of the various embodiments.

FIG. 8 illustrates a portion of user interface 800 for dynamic visualization and data analytics based on parameter actions in accordance with one or more of the various embodiments. In this example, visualization 802 is a scatter plot that illustrates profit vs sales information for an organization. In this example, one or more fields that corresponds to the scatter points may be associated with a parameter action object. Accordingly, in this example, if a user selects a point, such as, point 804, the values used to generate point 804 in visualization 802 may be assigned to a parameter that may be used for generating the some or all of the information displayed in detail window 806. For example, in some embodiments, the values associated with point 804 may be assigned to a parameter which may be associated with various actions, such as, enabling the display engine to create detail window 806 and generate a sub-plot of sales and a sub-plot of profits.

Figure 9:
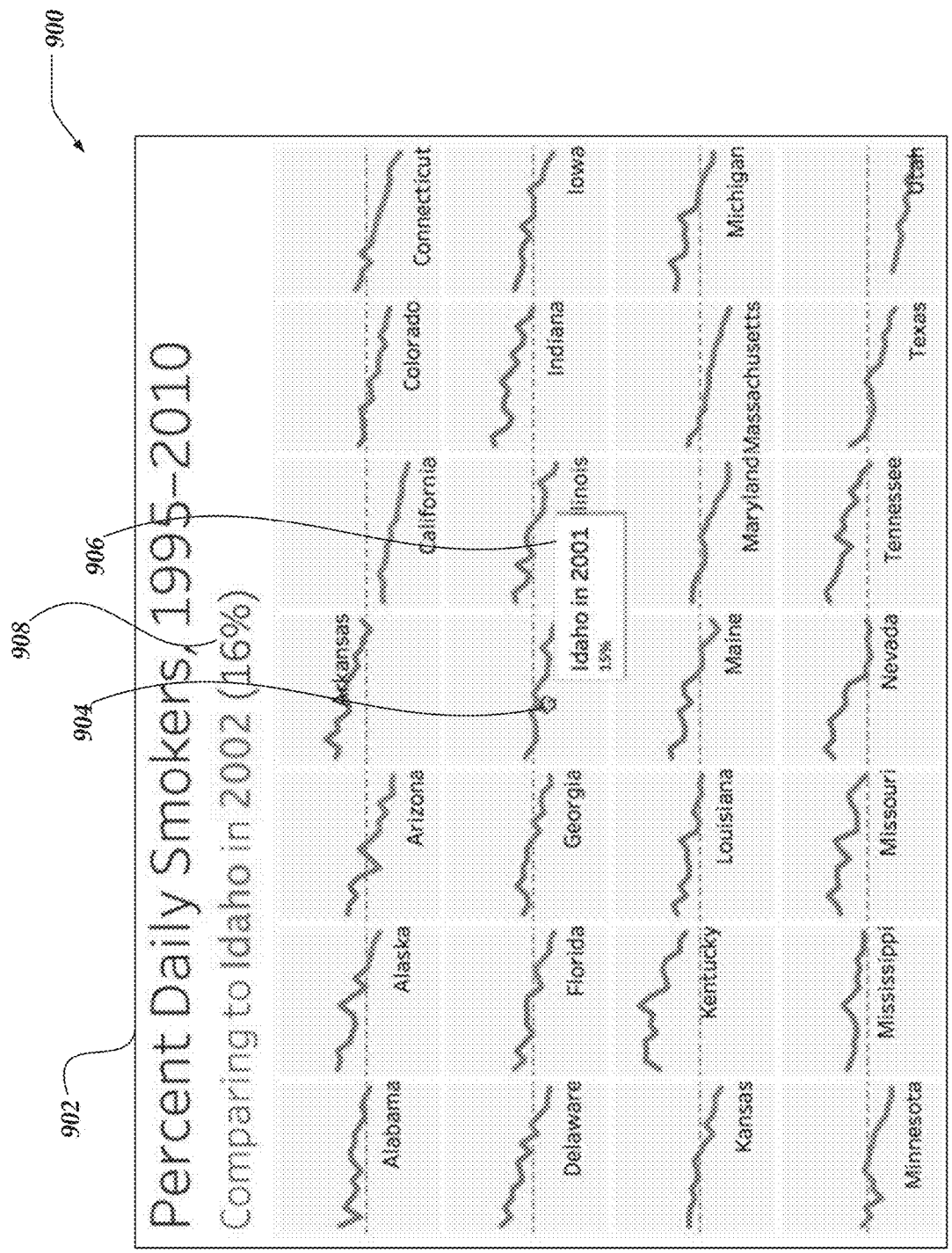
FIG. 9 illustrates a portion of a user interface for dynamic visualization and data analytics based on parameter actions in accordance with one or more of the various embodiments.

FIG. 9 illustrates a portion of user interface 900 for dynamic visualization and data analytics based on parameter actions in accordance with one or more of the various embodiments. In this example, visualization 902 shows multiple plots that illustrate the percentage of smokers in different states in the United States. In this example, a parameter action object has been associated with the plot points of each state-level plot. Thus, in this example, as a user selects a position 904 on a plot line, value at that point will be assigned a parameter associated with actions that may be used to create tooltip 906 and populate it based on the value assigned to the parameter and to update the label 908. Accordingly, as parameter action objects are activated, the display engine may dynamically modify the display model based on the actions that may be associated with the parameter and the values assigned the parameter as indicated by the user. Note, this enables a user to have the freedom and flexibility to analyze the information represented by visualization 902, even though they may be unaware of the actual values associated with the points that make of the plot line in visualization 902.

Figure 10:
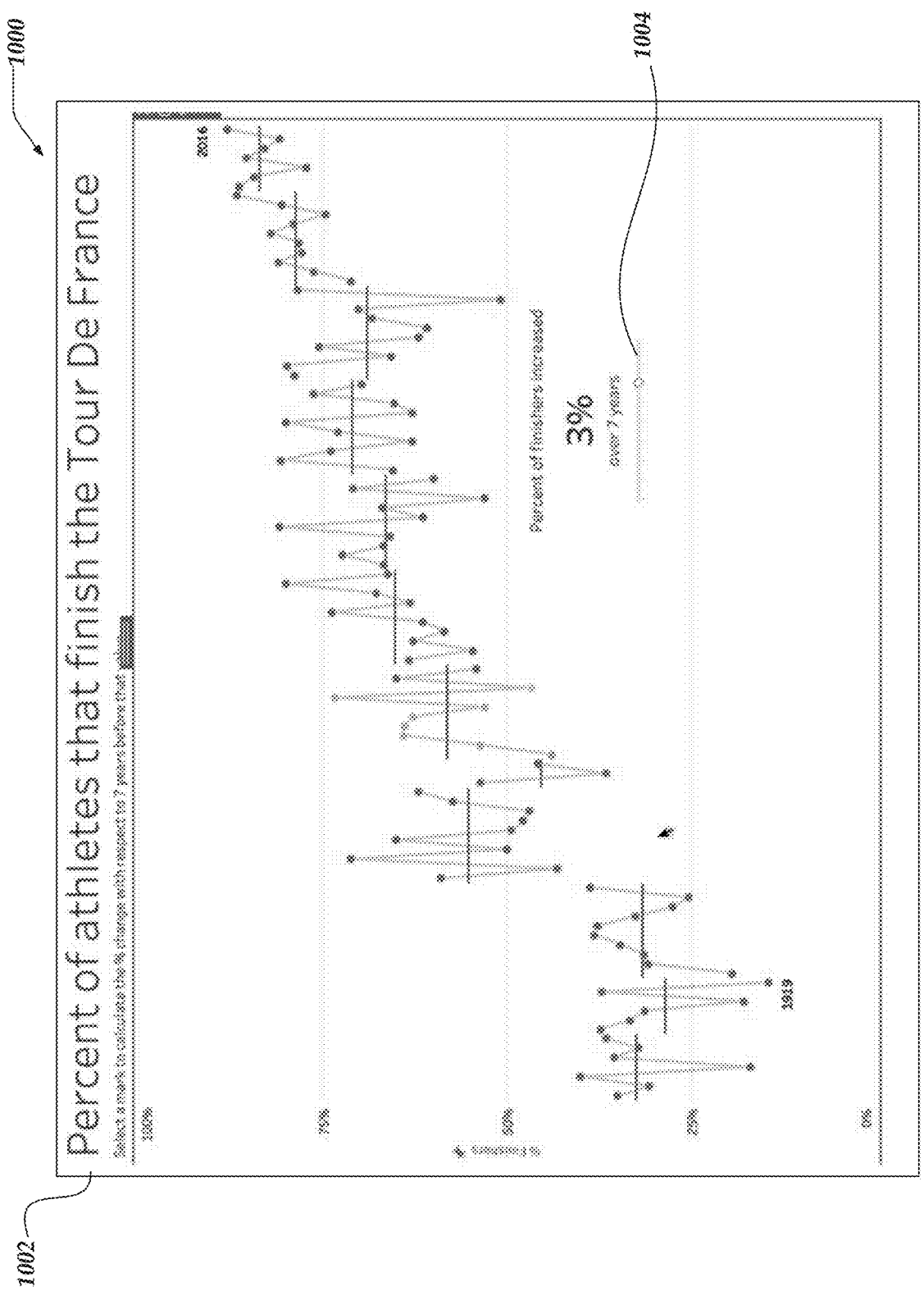
FIG. 10 illustrates a portion of a user interface for dynamic visualization and data analytics based on parameter actions in accordance with one or more of the various embodiments.

FIG. 10 illustrates a portion of user interface 1000 for dynamic visualization and data analytics based on parameter actions in accordance with one or more of the various embodiments. In this example, visualization 1002 shows a plot of the percentage of competitors in the Tour de France that completed the event. In this example, parameter action object 1004, shows the change in finish percentages for a given time-window. In this example, parameter action object 1004 may be activated if a user selects one of the time-windows (here set to be 7 years). In this example, upon activation, the plot point values in the selected time-band may be used to populate a parameter that is associated with an action that computes and displays the change in finish percentages for the selected time-window.

In this example, foursome embodiments, if a user selects a different time-window, the display engine may employ the parameter action object to compute the change in finish percentage for the selected time-window without requiring intervention by the author of visualization 1002 or without requiring the user to have knowledge of the underlying data used to generate visualization 1002.

Generalized Operations

Figure 11:
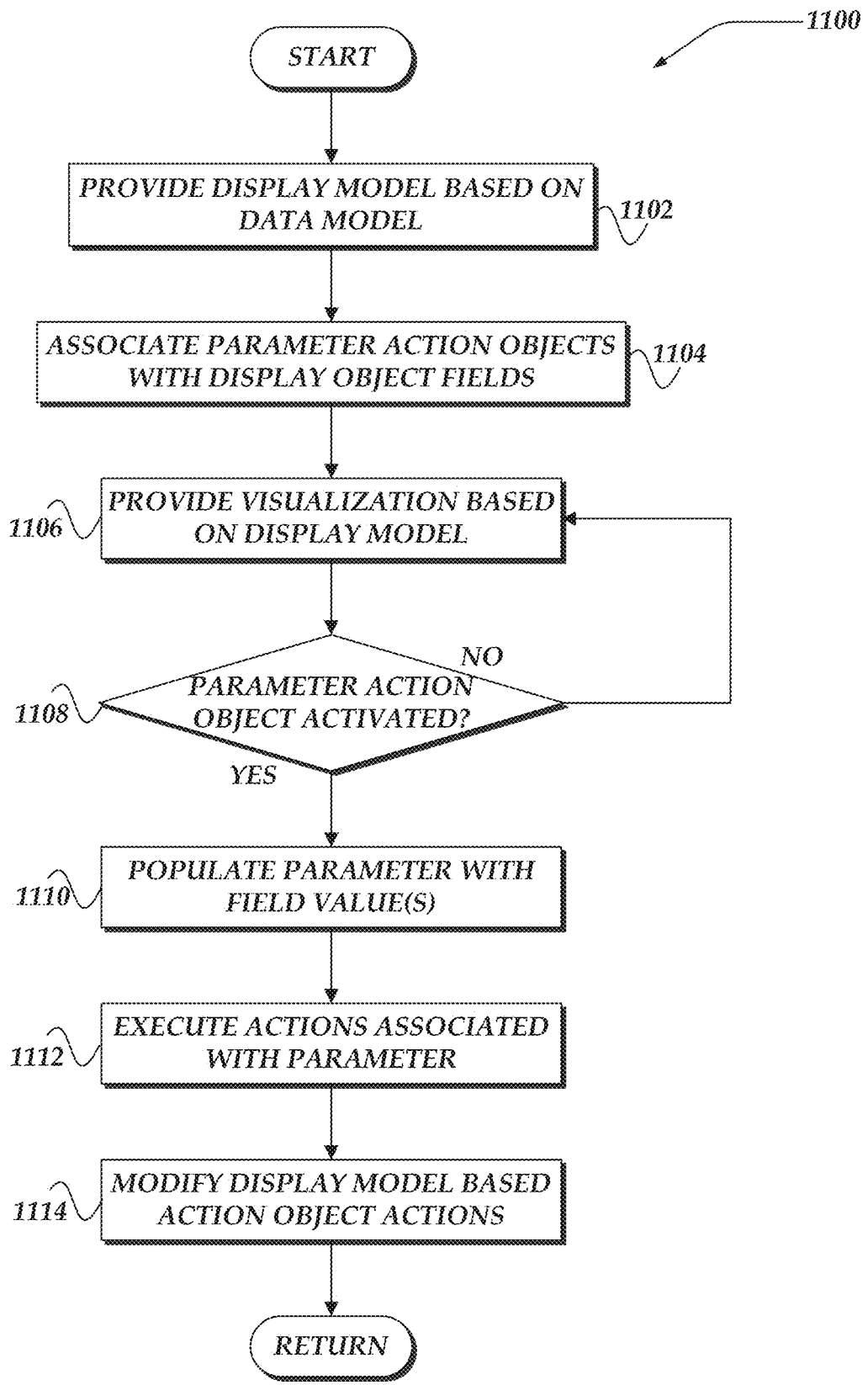
FIG. 11 illustrates an overview flowchart of a process for dynamic visualization and data analytics based on parameter actions in accordance with one or more of the various embodiments.
Figure 12:
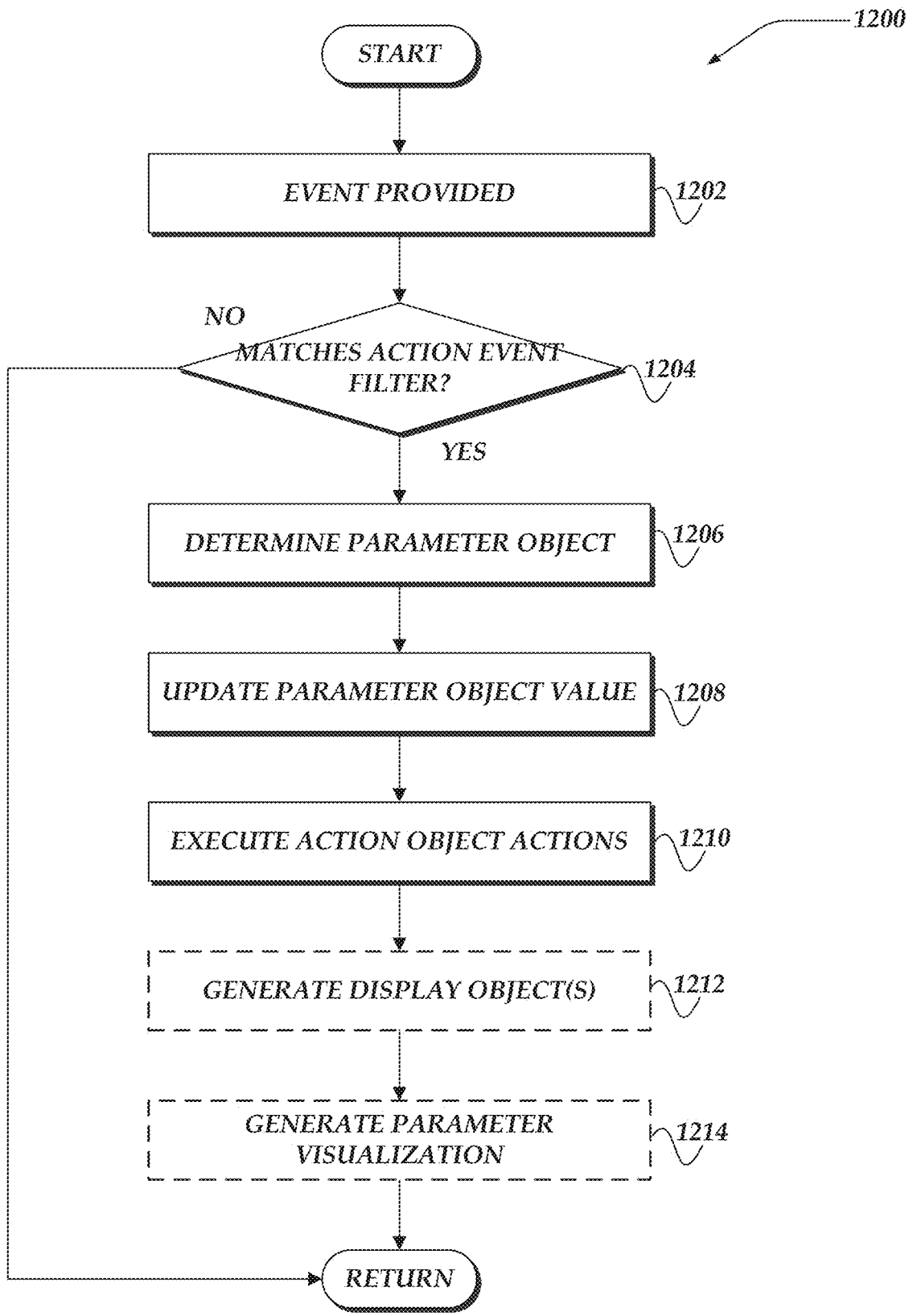
FIG. 12 illustrates a flowchart of a process for dynamic visualization and data analytics based on parameter actions in accordance with one or more of the various embodiments.

FIGS. 11-12 represent generalized operations for dynamic visualization and data analytics based on parameter actions in accordance with one or more of the various embodiments. In one or more of the various embodiments, process 1100 or 1200 described in conjunction with FIGS. 11-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the process described in conjunction with FIGS. 11-12 may be used for dynamic visualization and data analytics based on parameter actions in accordance with at least one of the various embodiments, architectures or user interfaces such as those described in conjunction with FIGS. 4-10. Further, in one or more of the various embodiments, some or all of the steps performed by process 1100 or process 1200 may be executed in whole or in part by modeling engine 322, display engine 324, or the like, running on one or more processors of one or more network computers.

Accordingly, FIG. 11 illustrates an overview flowchart of process 1100 for dynamic visualization and data analytics based on parameter actions in accordance with one or more of the various embodiments. After a start block, at start block 1102, in one or more of the various embodiments, a display model based on a data model may be provided. In some embodiments, modeling engines may be arranged to automatically generate display models from data models based on templates, rules, or the like. In other embodiments, the modeling engine may be arranged to provide an authoring tool to one or more authoring users for authoring display models. In some embodiments, display models may be represented using one or more standard graphic description languages or format. Accordingly, in some embodiments, some or all of the display model information may be provided by an external application or service.

At block 1104, in one or more of the various embodiments, one or more parameter action objects may be associated with one or more display objects or display object fields included in the display model.

At block 1106, in one or more of the various embodiments, the display engine may employ the display model to provide a visualization for display on a hardware display. For example, in some embodiments, a non-authoring user may employ a client display engine to access a database (or list) of display models and select one to view on their display hardware.

At decision block 1108, in one or more of the various embodiments, if a parameter action object is activated, control may flow to block 1110; otherwise, control may loop back to block 1106. As described above, one or more parameter action objects may be associated with one or more input signals that may be associated with one or more display objects in the display model. For example, a display engine may be arranged to monitor various input sources for signals or inputs that may be associated with the activation of a parameter action object. Thus, in some embodiments, interactions performed by a user, such as, clicking on portions of display objects, hovering a user-interface pointer over a display object, or the like, may trigger the activation of a parameter action object.

At block 1110, in one or more of the various embodiments, in response to the activation of the parameter action object, the parameter associated with the parameter action object may be assigned one or more values associated with the display model. The particular display object field or display object that provides the values for assignment may be determined when the parameter action objects is created by an authoring user.

At block 1112, in one or more of the various embodiments, the display engine may be arranged to execute one or more actions that are associated with the parameter based on the values that may be assigned to the parameter.

At block 1114, in one or more of the various embodiments, the display engine may be arranged to modify the display model based on the execution of one or more actions associated activated parameter action objects and the value that was assigned to the parameter that may be associated with the parameter action object. Next, control may be returned to a calling process.

FIG. 12 illustrates a flowchart of process 1200 for dynamic visualization and data analytics based on parameter actions in accordance with one or more of the various embodiments. After a start block, at start block 1202, in one or more of the various embodiments, one or more events may be generated or provided to or by a display engine. As described above, events may be derived from or associated with various user inputs, such as, pointer placement (hovering), mouse clicks, touches, or the like. Also, in some embodiments, one or more events may be generated by a data object field value or display object field value exceeding a threshold value, or the like. In some embodiments, events may be defined using rules, patterns, instructions, or the like, provided via configuration information to account for local circumstances or requirements.

At decision block 1204, in one or more of the various embodiments, if one or more of the events matches an event filter associated with an action object, control may flow to block 1206; otherwise, control may be returned to a calling process. As described above, in some embodiments, parameter action objects may be associated with one or more events via an event filter, or the like. in one or more of the various embodiments, events or event information provided to a display engine may include event identifiers, names, labels, tag, type information, or the like, that may be employed to associate events with action objects. Accordingly, in one or more of the various embodiments, if the provided events may be associated with an action object, the display engine may execute further actions to process the event; otherwise, the event may be ignored with respect to action objects.

Further, in some embodiments, parameter objects, action objects, or parameter action objects may be arranged to be subscribed to particular events. Thus, in some embodiments, if a subscribed event occurs, the subscribed objects may be provided event information associated with the subscribed events.

At block 1206, in one or more of the various embodiments, the parameter objects associated with the action object may be determined. In some embodiments, action objects associated with the incoming events may be associated with parameter objects. Accordingly, in some embodiments, data structures, or the like, that comprise action object may include identifiers of parameter objects or references to parameter objects. This identification or reference information may be employed to determine the parameter objects that may be associated with an action object that may be triggered by the incoming events.

At block 1208, in one or more of the various embodiments, the values for the parameter objects may be updated. In some embodiments, the parameter objects may be arranged to update their current value if they are selected or otherwise activated. In some embodiments, this may include retrieving values from one or more data object fields, display object fields, performing one or more computations, or the like.

At block 1210, in one or more of the various embodiments, the action object may be employed to execute one or more operations associated with the events or the parameter object. As described above, action objects may associate one or more operations (actions) or behaviors with a parameter object. In some embodiments, these operation may include computing values, displaying parameter visualizations, or the like. In some embodiments, display engines may be arranged to enable arbitrary, customized, or ad-hoc instructions or rules to define one or more operations of an action object. Accordingly, in some embodiments, display engines may be arranged to employ instructions, rules, or the like, provided via configuration information to define actions that account for local circumstances or local requirements.

At block 1212, in one or more of the various embodiments, optionally, one or more display objects may be generated based on the operations performed at block 1210. As described above, in some embodiments, operations associated with action objects may generate or modify one or more display objects associated with the parameter object or parameter action object. In one or more of the various embodiments, display engines may be arranged to modify the display model by including the generated or modified display object into the display model. Alternatively, in some embodiments, the necessary display object already be part of the display model such that they may be modified for the activated parameter action object rather being new display objects that are added the display model.

This block is marked as optional because, in some embodiments, the display objects may be available or otherwise generated previously.

At block 1214, in one or more of the various embodiments, optionally, a visualization engine may be arranged to generate a parameter visualization based on the parameter object value or the one or more displays objects generated for the parameter action object or associated with the parameter action object.

Note, this block is marked optional because, in some embodiments, generating parameter visualizations may be not be required. For example, in some embodiments, one or more particular parameter action objects may be represented using parameter visualizations that already exist. Or, in some embodiments, one or more particular parameter actions object may not be associated with display objects or parameter visualizations.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing visualizations of data using one or more processors that execute instructions to perform actions, comprising:
    displaying a visualization based on one or more display objects of one or more display models; and
    in response to occurrence of one or more events, performing further actions, including:
        determining a portion of one or more action objects associated with the one or more events;
        determining a portion of one or more parameter objects based on the portion of the action objects;
        generating one or more parameter display objects based on the portion of action objects and the portion of the parameter objects; and
        generating one or more parameter visualizations based on one or more parameter display objects, wherein the visualization is modified and displayed to include the one or more parameter visualizations.

2. The method of claim 1, further comprising:
    providing the one or more parameter objects that are associated with the one or more display objects of the display model, wherein the display model is based on a data model;
    providing the one or more action objects that are associated with the one or more parameter objects, wherein the one or more action objects are associated with one or more events.

3. The method of claim 1, wherein the one or more events further comprise:
    employing one or more of a rule, a pattern, or an instruction provided by configuration information to account for one or more local requirements.

4. The method of claim 1, wherein the one or more events, further comprise:
    employing one or more of a data object value or a display object value that exceed a threshold value to generate the one or more events.

5. The method of claim 1, wherein the one or more parameter display objects further comprise:
    providing one or more parts that are employed in the display of the visualization, wherein the one or more parts include one or more of a line, a graph, or a chart.

6. The method of claim 1, wherein the display model further comprises:
    generating the display model based on one or more of a data model or an authoring tool.

7. The method of claim 1, wherein generating the one or more parameter display objects, further comprises:
    determining one or more data objects that are associated with the portion of the one or more parameter objects based on the display model and the data model;
    determining one or more partial values based on the one or more data objects; and
    employing the one or more partial values to generate the one or more parameter display objects.

8. A system for managing visualizations of data over a network, comprising:
    a network computer, including:
        a memory that stores at least instructions; and
        one or more processors that execute instructions that perform actions, including:
            displaying a visualization based on one or more display objects of one or more display models; and
            in response to occurrence of one or more events, performing further actions, including:
                determining a portion of one or more action objects associated with the one or more events;
                determining a portion of one or more parameter objects based on the portion of the action objects;
                generating one or more parameter display objects based on the portion of action objects and the portion of the parameter objects; and
                generating one or more parameter visualizations based on one or more parameter display objects, wherein the visualization is modified and displayed to include the one or more parameter visualizations.

9. The system of claim 8, further comprising:
    providing the one or more parameter objects that are associated with the one or more display objects of the display model, wherein the display model is based on a data model;
    providing the one or more action objects that are associated with the one or more parameter objects, wherein the one or more action objects are associated with one or more events.

10. The system of claim 8, wherein the one or more events further comprise:

employing one or more of a rule, a pattern, or an instruction provided by configuration information to account for one or more local requirements.

11. The system of claim 8, wherein the one or more events, further comprise:
   employing one or more of a data object value or a display object value that exceed a threshold value to generate the one or more events.

12. The system of claim 8, wherein the one or more parameter display objects further comprise:
   providing one or more parts that are employed in the display of the visualization, wherein the one or more parts include one or more of a line, a graph, or a chart.

13. The system of claim 8, wherein the display model further comprises:
   generating the display model based on one or more of a data model or an authoring tool.

14. The system of claim 8, wherein generating the one or more parameter display objects, further comprises:
   determining one or more data objects that are associated with the portion of the one or more parameter objects based on the display model and the data model;
   determining one or more partial values based on the one or more data objects; and
   employing the one or more partial values to generate the one or more parameter display objects.

15. A processor readable non-transitory storage media that includes instructions for managing visualizations of data, wherein execution of the instructions by one or more processors on one or more network computers performs actions, comprising:
   displaying a visualization based on one or more display objects of one or more display models; and
   in response to occurrence of one or more events, performing further actions, including:
      determining a portion of one or more action objects associated with the one or more events;
      determining a portion of one or more parameter objects based on the portion of the action objects;
      generating one or more parameter display objects based on the portion of action objects and the portion of the parameter objects; and
      generating one or more parameter visualizations based on one or more parameter display objects, wherein the visualization is modified and displayed to include the one or more parameter visualizations.

16. The processor readable non-transitory storage media of claim 15, further comprising:
   providing the one or more parameter objects that are associated with the one or more display objects of the display model, wherein the display model is based on a data model;
   providing the one or more action objects that are associated with the one or more parameter objects, wherein the one or more action objects are associated with one or more events.

17. The processor readable non-transitory storage media of claim 15, wherein the one or more events further comprise:
   employing one or more of a rule, a pattern, or an instruction provided by configuration information to account for one or more local requirements.

18. The processor readable non-transitory storage media of claim 15, wherein the one or more events, further comprise:
   employing one or more of a data object value or a display object value that exceed a threshold value to generate the one or more events.

19. The processor readable non-transitory storage media of claim 15, wherein the one or more parameter display objects further comprise:
   providing one or more parts that are employed in the display of the visualization, wherein the one or more parts include one or more of a line, a graph, or a chart.

20. The processor readable non-transitory storage media of claim 15, wherein the display model further comprises:
   determining one or more data objects that are associated with the portion of the one or more parameter objects based on the display model and the data model;
   determining one or more partial values based on the one or more data objects; and
   employing the one or more partial values to generate the one or more parameter display objects.

* * * * *